United States Patent Office 2,847,453
Patented Aug. 12, 1958

2,847,453

PROCESS FOR THE PREPARATION OF ALPHA NITRATO- AND ALPHA HYDROXYISOBUTYRIC ACIDS

James H. Gardner, Wayland, and Thomas R. Steadman, Waban, Mass., assignors to Escambia Chemical Corporation, Pace, Fla., a corporation of Delaware No Drawing. Application January 6, 1958
Serial No. 707,079

10 Claims. (Cl. 260—466)

This invention relates to the production of valuable chemicals and in particular to the production of alpha hydroxyisobutyric acid and derivatives thereof. This application is, in part, a continuation of our copending application Serial No. 637,858, filed February 4, 1957, and now abandoned.

A principal object of the present invention is to provide an economical, integrated process for making alpha nitratoisobutyric acid, alpha hydroxyisobutyric acid and derivatives thereof from isobutylene.

Another object of the invention is to provide an economical integrated process for making methacrylic acid and esters thereof from isobutylene.

Still another object of the invention is to provide a process for converting isobutylene to esters of alpha hydroxyisobutyric acid.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

A particular aspect of the present invention is directed to the conversion of isobutylene to alpha nitratoisobutyric acid, alpha hydroxyisobutyric acid and derivatives thereof. This is preferably achieved by contacting isobutylene with dinitrogen tetroxide, and thereafter subjecting the resultant reaction products to further conditions of oxidation and hydrolysis. In one preferred embodiment of the invention the further treatment of the initial reaction products is obtained by maintaining the nitrogen containing derivatives of isobutylene in the presence of water and an oxidizing agent selected from the group consisting of oxides of nitrogen and nitric acid until a preponderance of such intermediates are converted to the desired acid or acids. When the initial reaction products or mixture are subjected to a further oxidation, then there can be recovered at least one product selected from the group consisting of alpha nitratoisobutyric acid, alpha hydroxyisobutyric acid and mixtures thereof. The resultant alpha nitratoisobutyric acid can be readily hydrolyzed to the alpha hydroxyisobutyric acid. When the resultant reaction products are subjected to both a further oxidation and hydrolysis, then the product is predominantly alpha hydroxyisobutyric acid. The alpha hydroxyisobutyric acid may subsequently be dehydrated or esterified or subjected to both an esterification and a dehydration to produce methacrylic acid and suitable esters thereof. Alpha nitratoisobutyric acid can be converted to alpha alkoxy isobutyric acid compounds which in turn can also be converted to methacrylic acid and suitable esters thereof.

The reaction between isobutylene and dinitrogen tetroxide preferably takes place when there is present at least one mole of dinitrogen tetroxide per mole of isobutylene to be reacted. This initial reaction is preferably carried out at relatively low temperatures and in particular at temperatures below about 40° C. The reaction products resulting from the above initial reaction are then subjected to or maintained under further conditions of oxidation and hydrolysis. In one embodiment of the invention the secondary reactions are achieved by means of nitric acid at temperatures between about 0° and 150° C. for suitable periods of time, which time period depends upon the particular temperature employed. The concentration and quantity of nitric acid employed for the secondary reactions can be varied considerably.

Specific detailed methods of practicing the present invention are set forth in the following non-limiting examples.

*Example I*

1100 grams of 100 percent nitric acid and 215 grams of dinitrogen tetroxide ($2NO_2 \rightleftarrows N_2O_4$) were charged to a reaction vessel and cooled to a temperature of about 5° C., after which time isobutylene was slowly bubbled therethrough. 107 grams of isobutylene were added to the reaction mixture as it was stirred over a period of about 5 hours while maintaining the temperature below about 10° C. After all the isobutylene had been fed, the reaction mixture was allowed to stand for about 16 hours at ice temperature (0° C.). Vacuum distillation at about 25° C. over a period of about 20 hours was then employed to remove the nitric acid and nitrogen oxides.

The residue was treated with 1650 mls. of a 2 N aqueous solution of sodium hydroxide at 60° C. for 24 hours. After acidification and ether extraction of the mixture, evaporation of the ether led to a solid residue. The solid residue, recrystallized from a small volume of benzene, yielded a crop of crystals amounting to 114.8 grams. The yield of alpha hydroxyisobutyric acid was thus 57.8 percent based on the original quantity of isobutylene fed to the reactor.

*Example II*

1561 grams of a 70 percent nitric acid solution and 323 grams of dinitrogen tetroxide ($2NO_2 \rightleftarrows N_2O_4$) were charged to a reaction vessel and cooled to a temperature of about 0° C., after which time isobutylene was slowly bubbled therethrough. 109 grams of isobutylene were added to the reaction mixture as it was stirred over a period of about 5 hours while maintaining the temperature below about 5° C. After all the isobutylene had been fed, the reaction mixture was allowed to stand for about 16 hours at ice temperature (0° C.). The resulting mixture was distilled in a vacuum at about 25° C. over a period of about 20 hours to remove the nitric acid and nitrogen oxides. The residue was hydrolyzed in a manner similar to that illustrated in Example I. The yield of crystals obtained in this run amounted to 139.0 grams. The yield of alpha hydroxyisobutyric acid was 68.7 percent based on the original quantity of isobutylene fed to the reactor.

*Example III*

A mixture of 100 parts of 70 percent aqueous nitric acid and 20 parts of dinitrogen tetroxide was pumped into a stirred stainless steel reactor at a rate of about 9.2 grams per minute. Simultaneously a stream of isobutylene was bubbled into the liquid in the reactor at a rate of about 0.74 gram per minute. The liquid holdup in the reactor was held constant by means of an overflow device. The average residence or reaction time of the reaction products in the reactor was on the order of about 30 minutes. A coolant circulating through the jacket of the reactor served to hold the temperature constant at about 5° C. The flows were continued until the composition of the effluent solution remained constant with respect to time and then long enough to allow a sample to be collected.

The collected sample after being held at 15° C. for 2 hours was then subjected to a vacuum distillation to remove the oxides of nitrogen. The residual solution was cooled to below about minus 20° C. and the alpha nitratoisobutyric acid which precipitated out was recovered. This represented a yield of about 26.4 percent based on the quantity of isobutylene fed to the reactor. Infrared spectrum of the mother liquor from which the alpha nitrato acid was precipitated indicated the presence therein of alpha hydroxyisobutyric acid and some alpha nitratoisobutyric acid. The nitric acid in the mother liquor was then distilled off the residual solution hydrolyzed and worked up as illustrated in Example I. A yield of alpha hydroxyisobutyric acid corresponding to 38.8 percent based on the quantity of isobutylene fed to the reactor was obtained. Thus the total yield of recovered material as or convertible to alpha hydroxyisobutyric acid was 65.2 percent.

*Example IV*

622 grams of 70 percent nitric acid solution and 126 grams of dinitrogen tetroxide were charged to a reaction vessel and cooled to a temperature of about minus 15° C. after which time isobutylene was slowly bubbled therethrough. 56 grams of isobutylene were added to the reaction mixture as it was stirred over a period of about 5 hours. After all the isobutylene had been fed, the reaction mixture was warmed to 30° C. and maintained there for about 30 minutes. The oxides of nitrogen were then distilled off. The residual solution was cooled to a temperature below about minus 20° C. and the alpha nitratoisobutyric acid which precipitated out was recovered. This represented a yield of about 30.0 percent based on the quantity of isobutylene fed to the reactor. The nitric acid in the mother liquor was then distilled off and the residual solution hydrolyzed and treated as illustrated in Example I. A yield of alpha hydroxyisobutyric acid corresponding to 38.7 percent was obtained. Thus, the total yield of recovered material as or convertible to alpha hydroxyisobutyric acid was 68.7 percent.

*Example V*

This run was carried out in a manner similar to that of Example IV with the exception that (1) 4.5 moles of dinitrogen tetroxide per mole of isobutylene were employed, (2) 3 moles of water were substituted for nitric acid, (3) the reaction temperature was 0° C. and (4) the holding temperature and time of the reaction mixture was 1 hour at 20° C. The addition of water instead of nitric acid to dinitrogen tetroxide produced a mixture containing but a small quantity of nitric acid. There was recovered from this run 39.1 percent of alpha nitratoisobutyric acid and 28.3 percent of alpha hydroxyisobutyric acid. Thus the total yield of recovered material as or convertible to alpha hydroxyisobutyric acid was 67.4 percent.

*Example VI*

55.6 grams of isobutylene were passed into 360 grams of dinitrogen tetroxide over a period of 100 minutes. The reaction mixture was stirred and maintained at 0° C. during this interval. Thereafter the mixture was poured into 180 grams of 70 percent nitric acid. This solution was then held at 30° C. for 30 minutes. Vacuum distillation was employed to remove the nitric acid and nitrogen oxides. The remaining residual solution was cooled to about minus 20° C. and the alpha nitratoisobutyric acid which precipitated out was filtered off. A yield of 39.3 percent of alpha nitratoisobutyric acid based on the quantity of isobutylene fed to the reaction vessel was obtained. The mother liquor was treated with a 2 N aqueous solution of sodium hydroxide at 60° C. for about 18 hours. After acidification and ether extraction of the saponification mixture, evaporation of the ether led to a solid residue. The solid residue represented a yield of alpha hydroxyisobutyric acid of about 34.2 percent based on the isobutylene fed to the reaction vessel. Thus, the total yield of product as or convertible to alpha hydroxyisobutyric acid was 73.5 percent.

*Example VII*

Dinitrogen tetroxide was pumped into a stirred stainless steel reactor at a rate of about 7.3 grams per minute. Simultaneously a stream of isobutylene was added to the reactor at a rate of about 1.48 grams per minute. Thus about 3 moles of dinitrogen tetroxide per mole of isobutylene was being fed. The liquid level in the reactor was held constant by means of an overflow device. The average residence time of the reaction mixture within the reactor was about 30 minutes. A coolant circulating through the jacket of the reactor served to hold the temperature constant at 5° C. When the composition of the effluent solution remained constant with respect to time, a sample of the overflow was collected. 180 grams of 70 percent nitric acid was added for each mole of isobutylene fed during the interval in which the sample was collected. The resulting solution was then held at 30° C. for about 30 minutes. Vacuum distillation at a temperature below 5° C. was then employed to remove any remaining nitrogen oxides. The remaining residual solution was cooled to about minus 20° C. and the alpha nitratoisobutyric acid which precipitated out was filtered off. A yield of 23.2 percent of alpha nitratoisobutyric acid based on the quantity of isobutylene fed to the reaction vessel during the period in which the sample was collected was obtained. An amount of water equal to the weight of nitric acid added earlier was added to the mother liquor and the resulting solution held at 60° C. for 24 hours. It was then evaporated leaving a residue containing mainly alpha hydroxyisobutyric acid with small amounts of alpha nitratoisobutyric acid. The residue represented a yield of 42.5 percent of alpha hydroxyisobutyric acid and alpha nitratoisobutyric acid. Thus the total yield of product as or convertible to alpha hydroxyisobutyric acid was 65.7 percent.

*Example VIII*

A series of runs were carried out in a manner similar to that of Example VII. The differences in conditions and results of these runs are given in the following table.

| Run No. | 1 | 2 | 3 | 4 |
|---|---|---|---|---|
| Moles $N_2O_4$ per Mole Isobutylene | 2.18 | 3 | 4.15 | 5.9. |
| Moles 70% $HNO_3$ per Moles Isobutylene. | 1.0 | *0 | 1.5 | *0. |
| Holding Period | 30 mins. @ 30° C. | 30 mins. @ 30° C. | none | 30 mins. @ 30° C. |
| Yield Alpha Nitratoisobutyric Acid, Percent. | 12.5 | 14.3 | 13.5 | 29.1. |
| Yield Alpha Hydroxyisobutyric Acid Percent. | 52.5 | 40.6 | 58.4 | 38.7. |
| Total Yield, Percent | 65.0 | 54.9 | 71.9 | 67.8. |

* About 2 moles of water per mole of isobutylene were added to the mother liquor.

Example IX

Dinitrogen tetroxide was pumped into a stirred stainless steel reactor at a rate of about 19.6 grams per minute. Simultaneously a stream of isobutylene was added to the reactor at a rate of about 2.98 grams per minute. Thus about 4.0 moles of dinitrogen tetroxide per mole of isobutylene were being fed. The liquid level in the reactor was held constant by means of an overflow device. The average residence time of the reaction mixture within the reactor was about 9 minutes. A coolant circulating through the jacket of the reactor served to hold the temperature constant at 0° C. When the composition of the effluent solution remained constant with respect to time, a sample of the overflow was collected over a period of about 17 minutes. The nitrogen oxides were then removed at a temperature below 5° C. and the remaining solution was maintained at 60° C. for 24 hours. It was then evaporated under vacuum leaving a residue of alpha hydroxyisobutyric acid containing some alpha nitratoisobutyric acid. The total yield of both these materials was 68.1%.

Example X

A series of runs were carried out in a manner similar to that of Example IX with the exception that various amounts of only water were added to the oxide-free solution. The results of these runs are given in the following table.

| Run Number | 5 | 6 | 7 | 8 |
|---|---|---|---|---|
| Moles $N_2O_4$ per Mole Isobutylene. | 4.0 | 4.05 | 4.05 | 5.15. |
| Reaction Temperature, °C. | 0 | 0 | 0 | 0. |
| Moles $H_2O$ added per Mole Isobutylene. | 2.0 | 0.6 | 1.0 | 2.0. |
| After Treatment | 40° C. for 1 hour; 60° C. for 23 hours. | 60° C. for 24 hours. | 100° C. for 1 hour. | 40° C. for 1 hour; 60° C. for 1 hour; 100° C. for 1.5 hours. |
| Yield Product, Percent | 75.2 | 68.7 | 65.7 | 82.7. |

Example XI

A series of runs were carried out in a manner similar to that of Example IX with the exception that various amounts of both water and nitric acid were added to the oxide-free solution. The results of these runs are given in the following table.

| Run Number | 9 | 10 | 11 |
|---|---|---|---|
| Moles $N_2O_4$ added per Mole Isobutylene. | 4.0 | 4.0 | 3.9. |
| Moles $H_2O$ added per Mole Isobutylene. | 0.6 | 2.6 | 1.6. |
| Moles $HNO_3$ added per Mole Isobutylene. | 0.4 | 0.4 | 0.4. |
| After Treatment | 60° C. for 24 hours. | 40° C. for 1 hour; 60° C. for 23 hours. | 100° C. for 0.5 hour. |
| Yield Product, Percent | 75.0 | 80.5 | 63.2. |

Example XII

A run was carried out in a manner similar to that of Example IX except that the after treatment given to the material collected from the reactor was limited to distilling off the nitrogen oxides under vacuum at a temperature below 5° C. The acidic portion of the residue was only sufficient to account for a yield of 16 percent as alpha nitrato isobutyric acid. Infrared examination of the residue disclosed the presence of alpha nitratoisobutyraldehyde, alpha nitratoisobutyric anhydride and alpha nitratoisobutyric acid. The infrared analysis failed to disclose the presence of any alpha hydroxyisobutyric acid.

Example XIII 0.242 gram of alpha nitratoisobutyraldehyde was treated with 0.142 gram of 45% nitric acid for 18 hours at 60° C. Thereafter the solution was evaporated at room temperature under vacuum, leaving 0.145 gram of white crystals, identified as alpha hydroxyisobutyric acid by its infrared spectrum.

Example XIV 118 grams of methyl alpha hydroxyisobutyrate (formed by the esterification of alpha hydroxyisobutyric acid with methanol) and a few grams of copper powder catalyst were charged to a reactor. 71 grams of $P_2O_5$ were added to the stirred reaction mixture over a period of about 15 minutes. Upon completion of the addition, the reaction mixture was then distilled and a yield of methyl methacrylate corresponding to 92.8 percent was recovered.

The conversion of isobutylene to high yields of product as or convertible to alpha hydroxyisobutyric acid is a multi-step or stage reaction which consists of an initial or first step wherein isobutylene reacts with liquid dinitrogen tetroxide at a relatively low temperature to form a complex mixture of nitrogen-containing products.

The initial reaction proceeds very rapidly. For this reaction, there is employed at least one mole of dinitrogen tetroxide per mole of isobutylene employed. However, it has been found that there is some increase in the yields with increasing amounts of dinitrogen tetroxide. Best results have been attained when more than one, and preferably from about 3 moles or greater, of dinitrogen tetroxide per mole of isobutylene are employed. This initial reaction is exothermic and temperature control is very important. This reaction should be carried out at temperatures below about 40° C. and can be at superatmospheric or reduced pressures if desired.

With regard to the use of dinitrogen tetroxide, it should be noted that dinitrogen tetroxide is an equilibrium mixture of the monomer ($NO_2$) and the dimer ($N_2O_4$). The equilibrium concentration of the monomer is a function of temperature, as described in "Inorganic Chemistry," F. Ephraim, 3rd English edition, New York, Nordman, 1939, page 667. When used in the specification and the claims, the expression "dinitrogen tetroxide" is intended to include the equilibrium concentration of the monomer at the temperature employed.

The complex mixture of nitrogen-containing products resulting from the above initial reaction has been found to contain, among other materials, substantial quantities of alpha nitratoisobutyraldehyde and alpha nitratoisobutyric anhydride. Thus, in order to obtain alpha hydroxyisobutyric acid, from this complex mixture, it is necessary to subject the reaction products or mixture resulting from the reaction between isobutylene and dinitrogen tetroxide to further conditions of oxidation and hydrolysis. When the initial reaction products are subjected to conditions which are primarily oxidative, then there can be recovered in varying amounts alpha nitratoisobutyric acid, and alpha hydroxyisobutyric acid. When the initial reaction products are subjected to both further conditions of oxidation and hydrolysis, then the product recoverable is predominantly alpha hydroxyisobutyric acid.

The treatment of the nitrogen-containing reaction intermediates can be carried out in several ways. For example, the further oxidation of the initial reaction products can be accomplished by maintaining the reaction products at a temperature between about 0° and 150° C. In this embodiment it is believed that the oxidation of the aldehyde is accomplished by an intramolecular oxidation. That is, there is effected a decomposition or degradation of some intermediate nitrogen-containing compounds to yield nitrogen oxides and appreciable amounts of water which bring about oxidation of the alpha nitratoisobutyraldehyde and some hydrolysis of the alpha nitratoisobutyric anhydride and/or resultant alpha nitratoisobutyric acid to alpha hydroxyisobutyric acid. Thus, the only treatment required to convert the initial reaction products to alpha hydroxyisobutyric acid and alpha nitratoisobutyric acid is an additional standing at a temperature between about 0° C. and 150° C., preferably above about 15° C., for a suitable period of time which can be but minutes. No addition of water and/or nitric acid is required.

However water and/or nitric acid can be added to facilitate a more complete oxidation and hydrolysis so that the product recoverable is predominantly alpha hydroxyisobutyric acid. When it is desirable to add additional water to effect relatively complete hydrolysis of the hydrolyzable products, it can be done at any point in the process. Likewise, when it is desirable to add additional nitric acid for any reason, e. g., as an oxidant or to catalyze the hydrolysis reactions, it can also be done at any point in the process as is illustrated in the examples. Additional hydrolysis of the alpha nitratoisobutyric acid of the alpha hydroxyisobutyric acid can be accomplished by the use of water, aqueous acid solutions, or aqueous alkali metal hydroxide solutions. Additionally the hydrolysis can be carried out as a separate and distinct step from the oxidation of the reaction products or it can be merged with the oxidation so as to involve but one step. The alpha nitratoisobutyric acid or alpha nitratoisobutyric anhydride produced can be recovered and subsequently hydrolyzed or they can be hydrolyzed while contained in the reaction mixture.

Similarly the intermediate alpha nitratoisobutyraldehyde may be isolated and further oxidized to the desired acid by use of ordinary oxidizing agents such as oxygen, hydrogen peroxide, potassium permanganate, nitrogen oxides, nitric acid and the like.

Alpha nitratoisobutyric acid can be selectively recovered from the reaction mixture by cooling or chilling the resulting reaction mixture to a low temperature so as to achieve a precipitation or crystallization of the alpha nitratoisobutyric acid. In one preferred embodiment, the reaction mixture is chilled or cooled to temperatures below about 0° C. The desired alpha nitrato- and alpha hydroxyisobutyric acids can be separated from the reaction mixture and from each other as such or they can first be converted to esters, amides, insoluble metal salts or other derivatives and then separated. The preparation of the esters, amides, salts and the like of these acids can be accomplished by well-known techniques such as is illustrated in U. S. Patents 1,775,636; 1,927,295; 2,245,483; 2,336,317; 2,348,710; 2,355,330; 2,362,326; 2,383,897; 2,811,546 and Journal Organic Chemistry 3, 312 (1938).

The term "acid" as used in the specification and claims is thus intended to include esters, amides, anhydride, salts and other functional derivatives obtained by modification of the carboxyl group and/or alpha substituent.

The feed material need not comprise pure isobutylene. It is possible to use a mixture of isobutane and isobutylene as it has been found that isobutane does not react appreciably under these conditions.

The alpha hydroxyisobutyric acid obtained may be esterified or dehydrated or subjected to both an esterification and a dehydration. If esters of the alpha hydroxyisobutyric acid are desired, then the alpha hydroxyisobutyric acid can be simply esterified with a suitable alcohol such as the aliphatic alcohols, methanol, ethanol, propanol, the butanols and higher aliphatic alcohols. In addition to the aliphatic esters, aromatic esters, cycloaliphatic esters and heterocyclic esters can also be prepared. Such esters may be produced by the general procedures described by Clinton and Laskowski, Journal of American Chemical Society 70—3135 (1948) or described in the above mentioned patents. If methacrylic acid is the desired end product, then the alpha hydroxyisobutyric acid may be dehydrated to the desired acid. Likewise, if an ester of methacrylic acid is desired, then the alpha hydroxyisobutyric acid may be esterified with a suitable alcohol and the ester dehydrated. The dehydration may be accomplished by means of $P_2O_5$ or by any of the procedures shown in British Patent 409,733 or in U. S. Patents 1,993,089; 2,054,242; 2,100,993; 2,184,934; 2,226,645; 2,244,389 and 2,356,247.

Alpha nitratoisobutyric acid can be converted to methacrylic acid and esters thereof by the procedures described in U. S. Patent 2,816,921, British Patent 584,607 and Journal American Chemical Society 70—1153 (1948).

Since certain changes may be made in the above process without departing from the scope of the invention herein involved, it is intended that all matter contained in the above description shall be interpreted as illustrative and not in a limiting sense.

What is claimed is:

1. In the process of producing acids selected from the group consisting of alpha nitratoisobutyric acid, alpha hydroxyisobutyric acid and mixtures thereof wherein isobutylene is reacted with liquid dinitrogen tetroxide to form some of the desired acids and other nitrogen-containing derivatives of isobutylene which are intermediates in the conversion of isobutylene to the desired acids, the improvement which comprises maintaining said intermediates in the presence of water and an oxidizing agent selected from the group consisting of oxides of nitrogen and nitric acid until a preponderance of such intermediates are converted to the desired acids, and separating one of said acids from the reaction medium and from the other of said acids.

2. The process of claim 1 wherein the water is obtained as a byproduct in the formation of the intermediates.

3. The process of claim 1 wherein the intermediates are held in the presence of the water and the oxidizing agent at a temperature above 15° C. and below 150° C. for a time in excess of 30 minutes.

4. The process of claim 1 wherein the intermediates are held at a temperature above 60° C. in the presence of the water and the oxidizing agent.

5. The process of claim 1 wherein at least 1 mole of water is added for each mole of isobutylene in the reaction intermediates and the intermediates are maintained in the presence of the added water and the oxidizing agent until said intermediates are converted to alpha hydroxyisobutyric acid.

6. The process of claim 1 wherein nitric acid and water are added to the intermediates, there being at least 1 mole of water and at least 1 mole of nitric acid for each mole of isobutylene in the reaction intermediates and the intermediates are maintained in the presence of the added nitric acid and water until a preponderance of such intermediates are converted to alpha hydroxyisobutyric acid.

7. The process of claim 1 wherein a substantial amount of nitric acid is present along with the liquid dinitrogen tetroxide during the initial reaction between the dinitrogen tetroxide and isobutylene.

8. The process of claim 1 wherein dinitrogen tetroxide is removed from the reaction mixture and water is then added to the residual reaction mixture.

9. The process of claim 1 wherein the nitric acid is obtained as a byproduct in the formation of the intermediates.

10. In the process of producing an acid selected from the group consisting of alpha nitratoisobutyric acid, alpha hydroxyisobutyric acid and mixtures thereof wherein isobutylene is reacted with liquid dinitrogen tetroxide to form some of the desired acids and substantial quantities of alpha nitratoisobutyraldehyde, the improvement which comprises oxidizing the alpha nitratoisobutyraldehyde to the desired acid.

No references cited.